(12) United States Patent
Griffin et al.

(10) Patent No.: US 7,927,105 B2
(45) Date of Patent: Apr. 19, 2011

(54) METHOD AND SYSTEM FOR CREATING AND DELIVERING PRESCRIPTIVE LEARNING

(75) Inventors: Charles W. Griffin, Davenport, IA (US); Marla A. Haddon, Dunwoody, GA (US); Biao Luo, Alpharetta, GA (US); John R. Malpass, Atlanta, GA (US); Benjamin J. Montello, Acworth, GA (US)

(73) Assignee: International Business Machines Incorporated, Armonk, NY (US)

( * ) Notice: Subject to any disclaimer, the term of this patent is extended or adjusted under 35 U.S.C. 154(b) by 971 days.

(21) Appl. No.: 10/933,608

(22) Filed: Sep. 2, 2004

(65) Prior Publication Data
US 2006/0046237 A1    Mar. 2, 2006

(51) Int. Cl.
G09B 11/00 (2006.01)
G06F 11/34 (2006.01)

(52) U.S. Cl. .................... 434/219; 434/323; 705/11

(58) Field of Classification Search .............. 434/322, 434/323, 350, 362, 365, 219
See application file for complete search history.

(56) References Cited

U.S. PATENT DOCUMENTS

| | | | | |
|---|---|---|---|---|
| 5,395,243 A | * | 3/1995 | Lubin et al. | 434/118 |
| 5,597,312 A | * | 1/1997 | Bloom et al. | 434/362 |
| 5,757,371 A | * | 5/1998 | Oran et al. | 715/779 |
| 5,779,486 A | * | 7/1998 | Ho et al. | 434/353 |
| 5,987,443 A | | 11/1999 | Nichols et al. | |
| 6,213,780 B1 | * | 4/2001 | Ho et al. | 434/219 |
| 6,301,571 B1 | | 10/2001 | Tatsuoka | |
| 6,315,572 B1 | * | 11/2001 | Owens et al. | 434/322 |
| 6,347,943 B1 | * | 2/2002 | Fields et al. | 434/118 |
| 6,524,109 B1 | * | 2/2003 | Lacy et al. | 434/219 |
| 2002/0055916 A1 | | 5/2002 | Jost et al. | |
| 2002/0087346 A1 | * | 7/2002 | Harkey | 705/1 |
| 2003/0039948 A1 | * | 2/2003 | Donahue | 434/322 |
| 2003/0073063 A1 | | 4/2003 | Dattaray et al. | |
| 2003/0148253 A1 | | 8/2003 | Sacco et al. | |
| 2003/0152904 A1 | * | 8/2003 | Doty, Jr. | 434/350 |

OTHER PUBLICATIONS

Blackmon, W.H., and Rehak, D.R. Customized Learning: A Web Services Approach. Carnegie Mellon University [online], Jun. 2003 [retrieved on Apr. 11, 2006]. Retrieved from the Internet:< URL: http://www.lsal.cmu.edu/lsal/expertise/papers/conference/edmedia2003/customized20030625.pdf>.*

* cited by examiner

*Primary Examiner* — Kathleen Mosser
(74) *Attorney, Agent, or Firm* — Schmeiser, Olsen & Watts; John R. Pivnichny (57) ABSTRACT

Method for prescriptive learning. The method includes providing a user independent hierarchy of competencies, competency characteristics and assessments with associated rules that identify learning activities and identifying a user specific path through the hierarchy for a selected competency and competency characteristic based on the hierarchy, scoring of at least one question associated with at least one assessment associated with the selected competency characteristic. The rules and user specific information provide a user specific identification of learning activities.

9 Claims, 9 Drawing Sheets

Answer List

Add New Answer

| ID | Answer | Points | Required Activities | Optional Activities | | Action |
|---|---|---|---|---|---|---|
| 3408 | I've not used it yet | 1 | Required Activities ▼ | Business Problem Solving: The Problem-Solving Process ▼ | | Edit Delete Up |
| 3409 | I've used it 1-2 times | 2 | Required Activities ▼ | Optional Activities ▼ | | Edit Delete Up |
| 3410 | I've used it 3 times or more | 3 | Required Activities ▼ | Optional Activities ▼ | | Edit Delete Up |

PERFORMANCE COACH

Creative Problem Solving: Identifying Problems

Distributing Co. Scenario A

Use the information provided in the scenario below to answer the questions on the right side of the screen. Use the Next button to continue to the next question.

🖨 PRINT

Jon's mentor has just helped him gain a position on a high profile project for Distributing Co. A majority of the development has been completed. Most individual components have passed unit testing and are ready to be assembled for the final solution. Jon is confident that his recent training has fully prepared him for this role even though this is his first time applying his new skills. After receiving the design specifications and components, he realizes they are not as detailed as expected and contain some contradictions. Jon has limited access to his project's architect and his mentor. They will be happy to meet with him, but it may take time before they can fit him into their schedule and the time they have will be short.

Which of the following questions best describes Jon's fundamental problem?

○ How can Jon assemble the solution in the shortest time possible?

○ How can Jon resolve contradictions contained in the design specifications

○ How can Jon increase his confidence enough to solve the problems without the help of others ○ How can Jon get an extension on the project deadline because of the discrepancies in the design ○ I don't know

Branch Rule Composer

Branch Name: CC2 Tech B6-7 =4

Rule Set: Add New Rule

| Connector | Variable Name | Comparator | Value | |
|---|---|---|---|---|
| | 59-Assessment: Creative Problem Solving: Identifying Alternative Solutions | = | 4 | Delete |

Required Activities:
- Problem solving: General
- Decision making: General
- Generating Alternatives in Problem Solving
- Creative thinking
- Decision-making Fundamentals Optional Activities:
- Developing Fundamental Critical Thinking Skills
- Dynamic Decision Making
- Generating and evaluating solutions, and selecting
- Generating and evaluating solutions, and selecting Save  Cancel 400  402  404  406  410  408

Fig. 12

Identifying Alternative Solutions

| Learning Activity | Priority | Description | Duration | Completion |
|---|---|---|---|---|
| Problem solving: General | Required | QuickView | 15 mins | |
| Decision making: General | Required | QuickView | 15 mins | |
| Generating Alternatives in Problem Solving | Required | e-Learning/WBT: EDE066 | 150 mins | |
| Creative thinking | Required | QuickView | 15 mins | |
| Decision-making Fundamentals | Required | e-Learning/WBT: WK235 | 180 mins | |
| Critical thinking | Required | QuickView | 15 mins | |
| Using collaboration as a problem-solving tool - Learner | Required | ELA | 90 mins | |
| Developing Fundamental Critical Thinking Skills | Recommended | e-Learning/WBT: EDE080 | 180 mins | |
| Dynamic Decision Making | Recommended | e-Learning/WBT: EDE063 | 180 mins | |
| Generating and evaluating solutions, and selecting a solution - Assessment (technical audience bands 6 and 7) | Recommended | ELA | 60 mins | |
| Generating and evaluating solutions, and selecting a solution - Learner (technical audience bands 6 and 7) | Recommended | ELA | 60 mins | |

PRINT   Send to Manager   Update   Cancel

METHOD AND SYSTEM FOR CREATING AND DELIVERING PRESCRIPTIVE LEARNING

FIELD OF THE INVENTION

The invention relates to computer learning techniques and, more particularly, to prescriptive learning techniques.

BACKGROUND OF THE INVENTION

With the increase in the use of computers in the workplace and educational environments, computer-based learning tools have been developed to train workers and/or educate students. Certain of these computer-based learning tools have included the ability to teach specific tasks or subject matter and test a student's mastery of that subject matter or task.

Conventional enterprise wide Learning Management Systems (LMS) typically do not have the ability to dynamically generate competency based, prescriptive learning customized at the individual student level. For example, some current learning systems categorize learning by community, competency, group, role, etc., then provide a list of learning events. These learning events are typically assigned to the competency or category as a static list of items that typically can only vary on predefined properties, such as prerequisite courses. Furthermore, some conventional prescriptive learning systems have users answer hundreds of multiple choice questions in developing a prescriptive learning result. However, these basic multiple choice questions typically do not assess the knowledge, behaviors, or characteristics associated with competency based learning Additional learning systems are described in U.S. Pat. No. 5,987,443, which describes a goal based learning system utilizing a rule based expert training system to provide a cognitive educational experience. The system of the '443 patent is described as providing the user with a simulated environment that presents a business opportunity to understand and solve optimally. Mistakes are noted and remedial educational material presented dynamically to build the necessary skills that a user requires for success in the business endeavor. The system of the '443 patent utilizes an artificial intelligence engine driving individualized and dynamic feedback with synchronized video and graphics used to simulate real-world environment and interactions. Multiple "correct" answers are integrated into the learning system to allow individualized learning experiences in which navigation through the system is at a pace control led by the learner. A robust business model provides support for realistic activities and allows a user to experience real world consequences for their actions and decisions and entails realtime decision-making and synthesis of the educational material.

U.S. Pat. No. 6,301,571 describes a method for interacting with a test subject with respect to knowledge or functionality characterized by a plurality of states in one or more domains. A domain is a set of facts, a set of values, or a combination of a set of facts and a set of values. The set of facts for a knowledge domain is any set of facts. The set of facts for a functionality domain is a set of facts relating to the functionality of a test subject. A state is denoted as a fact state, a value state, or a combination state, a fact state being characterized by a-subset of facts, a value state being characterized by a subset of values, and a combination state being characterized by a combination of a subset of facts and a subset of values. The method of the '571 patent consists of specifying one or more domains, specifying a domain pool for each domain comprising a plurality of test item blocks consisting of one or more test items, specifying a class conditional density for each test item in each test item block for each state in each domain, selecting one or more test item blocks from the one or more domain pools to be administered to a test subject, and processing the responses of the test subject to the one or more test item blocks administered to the test subject.

United States Patent Application Publication No. US 2002/0055916 A1 describes a machine interface that allows a user to select a machine operation. A plurality of questions are stored for output to a user. A score indicating the likelihood that the user will select a machine operation is stored for each corresponding machine operation. A next question for output to the user is selected from the stored questions by determining, for each of a plurality of the questions, an average of the least number of questions required to be answered by the user to arrive at each machine operation weighted by the respective scores, and selecting the question having the lowest average number. The selected question is output and an answer is received from the user. In response to the input answer a machine operation is carried out and/or the stored scores for each of the plurality of machine operations is adjusted. At least one further selection of a next question is then carried out for output to the user using the adjusted stored scores. A set of data determined from at least one input answer may be stored and identified by a bookmark so that it can be retrieved when the bookmark identifier is determined from an input answer.

United States Patent Application Publication No. US 2003/0073063 A1 describes a distributed learning system that includes a server configured to store and deliver knowledge units. The knowledge units comprise interactive content. A user system is configured to selectively connect to the server over a network and to receive and store the knowledge units. The user system includes a browser and a run-time engine configured to interoperate with a Web browser to activate the Knowledge Units. A Knowledge Unit Builder (KUB) is configured to allow authors to create Knowledge Units comprising interactive content.

United States Patent Application Publication No. US 2003/0148253 A1 describes an educational method and system that teaches analytical and mathematical methods and concepts using multimedia based, open-ended, real world case studies and an experiential, interactive, self-paced, self-discovery instructional pedagogy. Students are challenged to find solutions to real world problems. Then students are directed toward efficient solution methods based upon an evaluation of their answer, or upon an evaluation of their description of their problem solving method. The evaluation of the student's response determines a degree of assistance provided. Assistance, or hints, are provided, each tailored to provide a predetermined degree of help directed to how to address the challenge, or how to more efficiently address the challenge, to better understand the problem. The teaching methodology of the '253 publication is described as leading students to a discovery of solution strategies, rather than showing or lecturing the students about the solutions or the solution strategies.

SUMMARY OF THE INVENTION

Some embodiments of the present invention provide methods, system and/or computer program products for providing prescriptive learning by providing a user independent hierarchy of competencies, competency characteristics and assessments with associated rules that identify learning activities and identifying a user specific path through the hierarchy for a selected competency and competency characteristic based on the hierarchy, scoring of at least one question associated with at least one assessment associated with the selected competency characteristic, the rules and user specific information to provide a user specific identification of learning activities.

In further embodiments of the present invention, the user independent hierarchy is provided by defining competency objects, competency characteristic objects, assessment objects and rule objects. The competency objects, competency characteristic objects, assessment objects and rule objects are organized into a tree hierarchy with parent/child relationships between the objects and rule objects at branches in the tree hierarchy.

In additional embodiments of the present invention, defining assessment objects includes selecting a question type from a plurality of questions types, defining a question of the selected question type, defining answers to the question and weighting the answers to provide a score for the assessment object. Furthermore, organizing the competency objects, competency characteristic objects, assessment objects and rule objects may include selecting an object from a list of available objects, selecting a location in a tree diagram to insert the selected object and inserting the selected object in the tree diagram at the selected location.

In still further embodiments of the present invention, defining rule objects includes selecting an object to be associated with the rule object, defining a value for the selected object such that if the selected object has the defined value a condition of the rule object is satisfied and selecting activities to associate with the selected object when the condition of the rule object is satisfied. The selected activities may include required activities and optional activities. The selected object in defining the rule object may be an assessment object and the defined value may be a score of the assessment object. The defined value may include a total score of an assessment object, a score of a single answer to a question of an assessment object and/or a combination of scores of a plurality of assessment objects.

In additional embodiments of the present invention, identifying a user specific path includes obtaining user input to select a competency, providing a list of competency characteristics associated with the selected competency, obtaining user input to select a competency characteristic from the list of competency characteristics, selecting at least one assessment to provide to the user based on the selected competency characteristic and/or user specific information, providing the selected assessment to the user, obtaining an answer to the provided assessment, scoring the answer and selecting learning activities for the user based on the scored answer.

The identification of the user specific path may also include selecting competencies from a plurality of competencies based on user specific information and providing the selected list of competencies to the user. In such a case, obtaining user input to select a competency may include obtaining user input to select a competency from the provided list of competencies. Furthermore, providing a list of competency characteristics may include selecting competency characteristics from a plurality of competency characteristics based on the selected competency and user specific information.

In further embodiments of the present invention, selecting learning activities for the user based on the scored answer includes evaluating a rule that associates learning activities with a score of the assessment to select the learning activities. The score of the assessment may include a score of a single question of the assessment, a total score of the assessment and/or a score of a plurality of assessments.

In additional embodiments of the present invention, selecting at least one assessment includes selecting a plurality of assessments and the selected plurality of assessments are provided to the user and answers to the assessments obtained from the user and scored and wherein the selected assessments are selected based on scores of previous assessments.

While embodiments of the present invention have been described primarily with reference to method aspects, embodiments of the present invention also include systems and/or computer program products.

BRIEF DESCRIPTION OF THE DRAWINGS

FIG. 6 is a screen capture of a user interface for providing weighting to answers of assessments according to some embodiments of the present invention.

FIG. 7 is a screen capture of an exemplary scenario based assessment according to some embodiments of the present invention.

FIG. 12 is a screen capture of a user interface for providing rule creation according to some embodiments of the present invention.

FIG. 13 is a screen capture of a user interface for providing results of a prescriptive learning assessment according to some embodiments of the present invention.

DETAILED DESCRIPTION OF EMBODIMENTS OF THE INVENTION

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as JAVA®, Smalltalk or C++. However, the computer program code for carrying out operations of the present invention may also be written in conventional procedural programming languages, such as the "C" programming language or in a visually oriented programming environment, such as VisualBasic. Dynamic scripting languages such as PHP, Python, XUL, etc. may also be used. It is also possible to use combinations of programming languages to provide computer program code for carrying out the operations of the present invention.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). For example, in some embodiments of the present invention, a graphic user interface may be rendered on a user's computer through the use of a web browser while the application code executes on one or more remote networked servers, each providing a specific function or functions (e.g. a database server, web servers, a load balance and one or more application servers).

The invention is described in part below with reference to flowchart illustrations and/or block diagrams of methods, systems and/or computer program products according to some embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with reference to FIGS. 1 through 13. As described herein, some embodiments of the present invention provide prescriptive learning and/or prescriptive learning authoring by providing a generic hierarchy of learning objects and identifying a user specific path through the generic hierarchy of learning objects to identify user specific learning activities.

Figure 1:
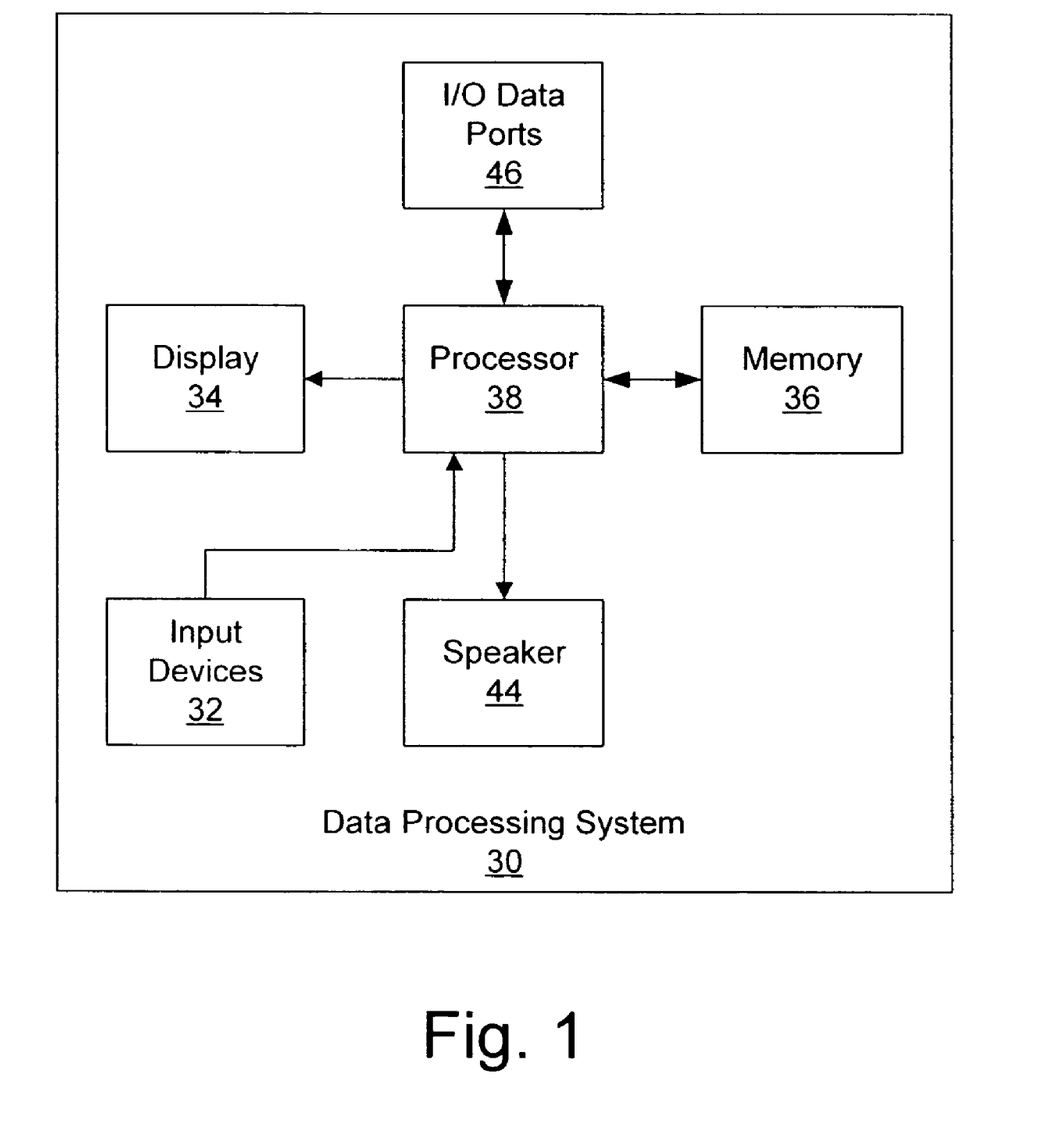
FIG. 1 is a block diagram of an exemplary data processing system suitable for use in embodiments of the present invention.

Referring now to FIG. 1, a block diagram of data processing systems suitable for use in systems according to some embodiments of the present invention will be discussed. As illustrated in FIG. 1, an exemplary embodiment of a data processing system 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 2:
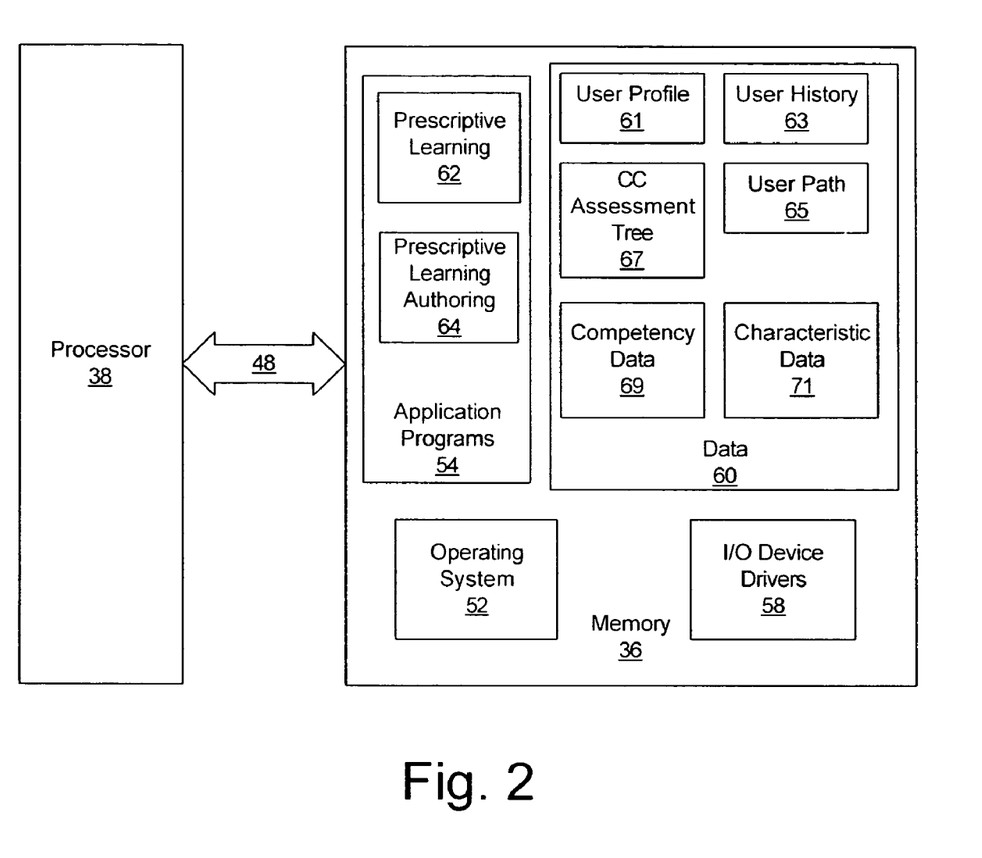
FIG. 2 is a more detailed block diagram of an exemplary data processing system incorporating some embodiments of the present invention.

FIG. 2 is a block diagram of data processing systems that illustrate systems, methods, and/or computer program products in accordance with some embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

As shown in FIG. 2, the memory 36 may include several categories of software and data used in the data processing system 30: the operating system 52; the application programs 54; the input/output (I/O) device drivers 58; and the data 60. As will be appreciated by those of skill in the art, the operating system 52 may be any operating system suitable for use with a data processing system such as OS/2, AIX or System390 from International Business Machines Corporation, Armonk, N.Y., Windows95, Windows98, Windows2000 or WindowsXP from Microsoft Corporation, Redmond, Wash., Unix, Linux, Sun Solaris or Macintosh OS X. The I/O device drivers 58 typically include software routines accessed through the operating system 52 by the application programs 54 to communicate with devices, such as the I/O data port(s) 46 and certain memory 36 components. The application programs 54 are illustrative of the programs that implement the various features of the data processing system 30. Finally, the data 60 represents the static and dynamic data used by the application programs 54, the operating system 52, the I/O device drivers 58, and other software programs that may reside in the memory 36.

As is further seen in FIG. 2, the application programs 54 may include a prescriptive learning application 62 and a prescriptive learning authoring application 64. The prescriptive learning authoring application 64 may be utilized to provide a user independent hierarchy of competencies, competency characteristics and/or assessments with associated rules that identify learning activities. The prescriptive learning application 62 may be utilized to identify a user specific path through the hierarchy for a selected competency and competency characteristic based on the hierarchy, scoring of at least one question associated with at least one assessment associated with the selected competency characteristic, the rules and/or user specific information to provide a user specific identification of learning activities.

The data portion 60 of memory 36, as shown in the embodiments illustrated in FIG. 2, may include user specific information, such as user profile data 61, user history data 63 and/or user path data 65. The data portion 60 may also include data that defines the generic hierarchy of learning objects, such as competency characteristic (CC) assessment tree data 67, possibly including rules data, competency data 69 and competency characteristic data 71. The data 60 may be utilized and/or created by the prescriptive learning application 62 and the prescriptive learning authoring application 64 to define the hierarchy and identify the user specific path as described in further detail herein.

While embodiments of the present invention have been illustrated in FIG. 2 with reference to a particular division between application programs, data and the like, the present invention should not be construed as limited to the configuration of FIG. 2 but is intended to encompass any configuration capable of carrying out the operations described herein. For example, while the prescriptive learning application 62 and prescriptive learning authoring application 64 are illustrated as separate applications, the functionality provided by the applications could be provided in a single application or in more than two applications.

Furthermore, a data processing system such as that illustrated in FIGS. 1 and 2 may be used to render a graphic interface to a user in embodiments of the present invention that provide a web-based graphic interface to the authoring tools and/or learning system. Such data processing systems may include, for example, a web browser, such as Mozilla, Mozilla Firefox, Safari, Internet Explorer, Opera, etc. that may execute on a suitable operating system, such as Windows2000, Windows XP, Linux, Macintosh OS X or other such operating systems. In such a case the application programs 54 may include a web browser application program.

Figure 3:
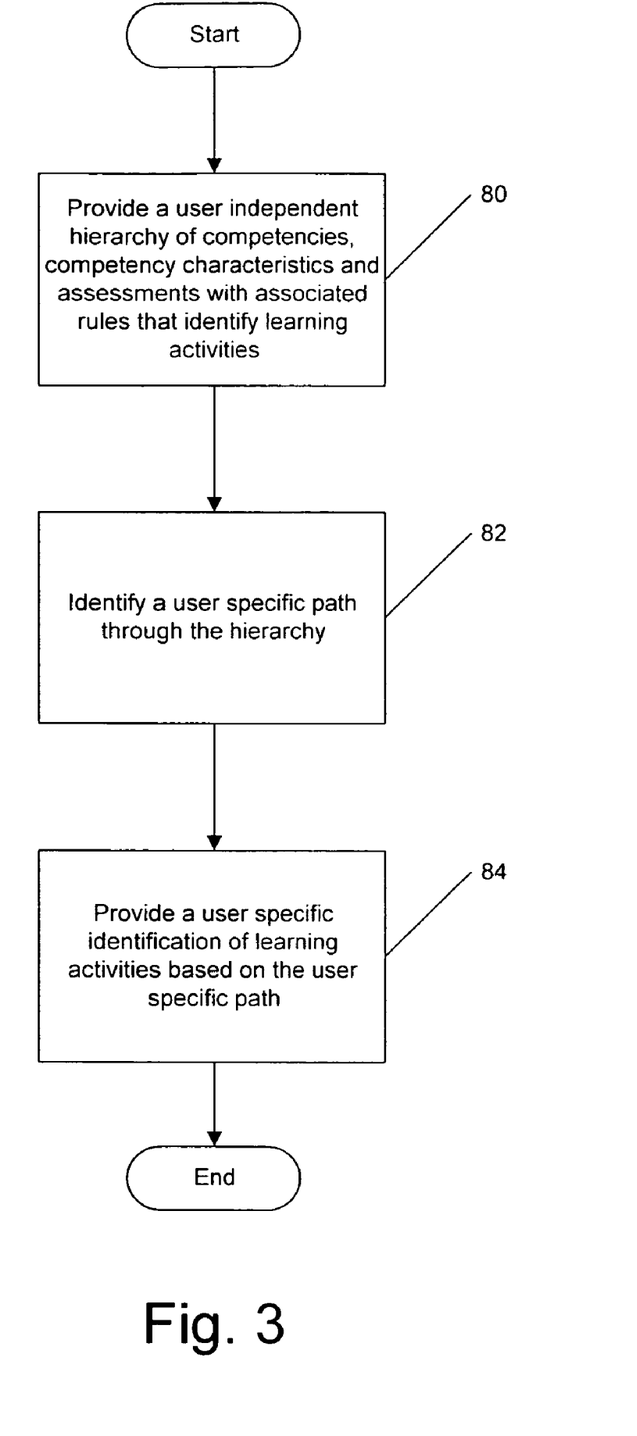
FIG. 3 is a flow chart illustrating operations according to some embodiments of the present invention.

FIG. 3 illustrates operations according to some embodiments of the present invention which may be carried out, for example, by the prescriptive learning authoring application 64 and/or the prescriptive learning application 62. As is seen in FIG. 3, a user independent hierarchy of competencies, competency characteristics and assessments with associated rules that identify learning activities is provided (block 80). As used herein, competencies refers to categories of skills that users may be taught and may include, for example, soft and/or hard skills. Competency characteristics are components of the competencies. Assessments are collections of one or more questions and their associated answers. The assessments may be associated with competency characteristics such that the answers to the questions may be evaluated to determine if a user possesses the competency characteristic. Rules may be used to identify learning activities that are specified for a user based on the assessments.

As is further seen in FIG. 3, a user specific path through the hierarchy is identified (block 82) and a user specific identification of learning activities is provided based on the user specific path (block 84). The user specific path may be identified based on user specific information that may include user profile information, such as job category, education level, etc., user history information, such as learning activities completed by the user, previous scorings of assessments completed by the user, etc. and/or the scoring of assessments completed by the user. By providing a user specific path through a generic hierarchy, the interaction with the user may be tailored to filter out irrelevant paths such that the user specific learning activities may be identified without the user traversing the entire generic hierarchy. Such a reduction in traversal of the hierarchy may reduce the amount of time required by a user to establish the user specific prescription of learning activities and may increase the likelihood that the prescribed learning activities are accurate, as the accuracy of the user's responses may decrease if the user becomes bored or frustrated with a large number of questions that may appear to be irrelevant to the user's specific circumstances.

Figure 4:
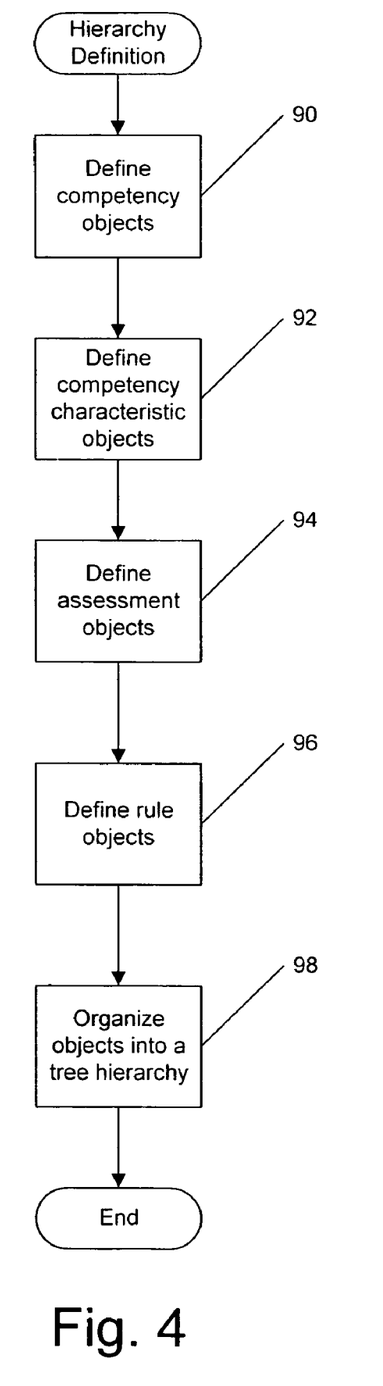
FIG. 4 is a flow chart illustrating operations according to some embodiments of the present invention.

FIG. 4 is a flowchart illustrating operations for generating a generic hierarchy according to some embodiments of the present invention. The operations of FIG. 4 may, for example, be carried out by the prescriptive learning authoring application 64. As seen in FIG. 4, generation of the hierarchy may begin by defining competency object(s) (block 90) and competency characteristic object(s) (block 92). The competency object(s) may be defined, for example, by providing one or more dialog boxes that allow an instructional designer or other user to identify properties of the competency object(s). Properties of the competency object(s) may include, for example, a unique identifier to associate with the object, a name of the object, etc. The competency characteristic object(s) may be defined, for example, by providing one or more dialog boxes that allow an instructional designer or other user to identify properties of the competency characteristic object(s) and associate the competency characteristic object(s) with a competency object. Alternatively and/or additionally, competency characteristic object(s) may be associated with their respective competency object when the tree relationship is created as discussed below. Properties of the competency characteristic object(s) may include, for example, a unique identifier to associate with the object, a name of the object, etc.

Returning to FIG. 4, assessment object(s) are also defined (block 94). The assessment object(s) may be defined, for example, by providing one or more dialog boxes that allow an instructional designer or other user to identify properties of the assessment object(s). The definition of the assessment object(s) may include a type or format of the assessment object(s) to allow for multiple different types of questions, such as multiple choice or Likert questions. The questions, answers and a scoring of the answers may also be defined.

Rule object(s) are also defined (block 96). The rule object(s) may be defined, for example, by providing one or more dialog boxes that allow instructional designer or other user to identify properties of the rule object(s). The definition of rule object(s) may include a value of a score of an assessment object, a question of an assessment object or multiple assessment objects and an identification of learning activities, either required or optional, that are associated with the score value. The definition of the rule object(s) could also include an identification of user specific information and a value for the user specific information as well as other objects that are associated with the value to provide branching in the generated hierarchy based on user specific information. For example, if a competency characteristic has different assessments associated with different job categories, the different assessments could be identified based on a user's job category as specified by a rule object.

The generated objects are organized into a tree hierarchy with parent/child relationships between the objects and rule objects at branches in the tree hierarchy (block 98). The organization of the objects may be provided by, for example, a user selecting objects to add to a tree hierarchy and selecting a location in the tree hierarchy of where to add the objects. For example, a competency object may be at a first level of the tree and as children corresponding competency characteristic objects. The competency characteristics may have rule objects at branches beneath them in the tree that are based on user specific information and the different branches may have assessment objects under the different rule objects and further rule objects under the different assessment objects that identify learning activities based on the score of the assessments.

While FIG. 4 describes the definition of specific learning objects, other objects may also be defined. Accordingly, embodiments of the present invention should not be construed as limited to the particular set of objects defined in FIG. 4 but may include additional objects that may be defined by an instructional designer or other user. Furthermore, the objects defined in FIG. 4 may be defined in different orders. Objects of different types may be defined in an overlapping order such that, for example, some competencies may be defined, then some competency characteristics may be defined, then additional competencies may be defined. Thus, FIG. 4 should not be construed as illustrating a particular sequence of definitions but as illustrating that objects that have been previously defined are subsequently organized into the tree hierarchy. Subsequent definitions could also be provided and then organized into an existing tree hierarchy as well.

Figure 5:
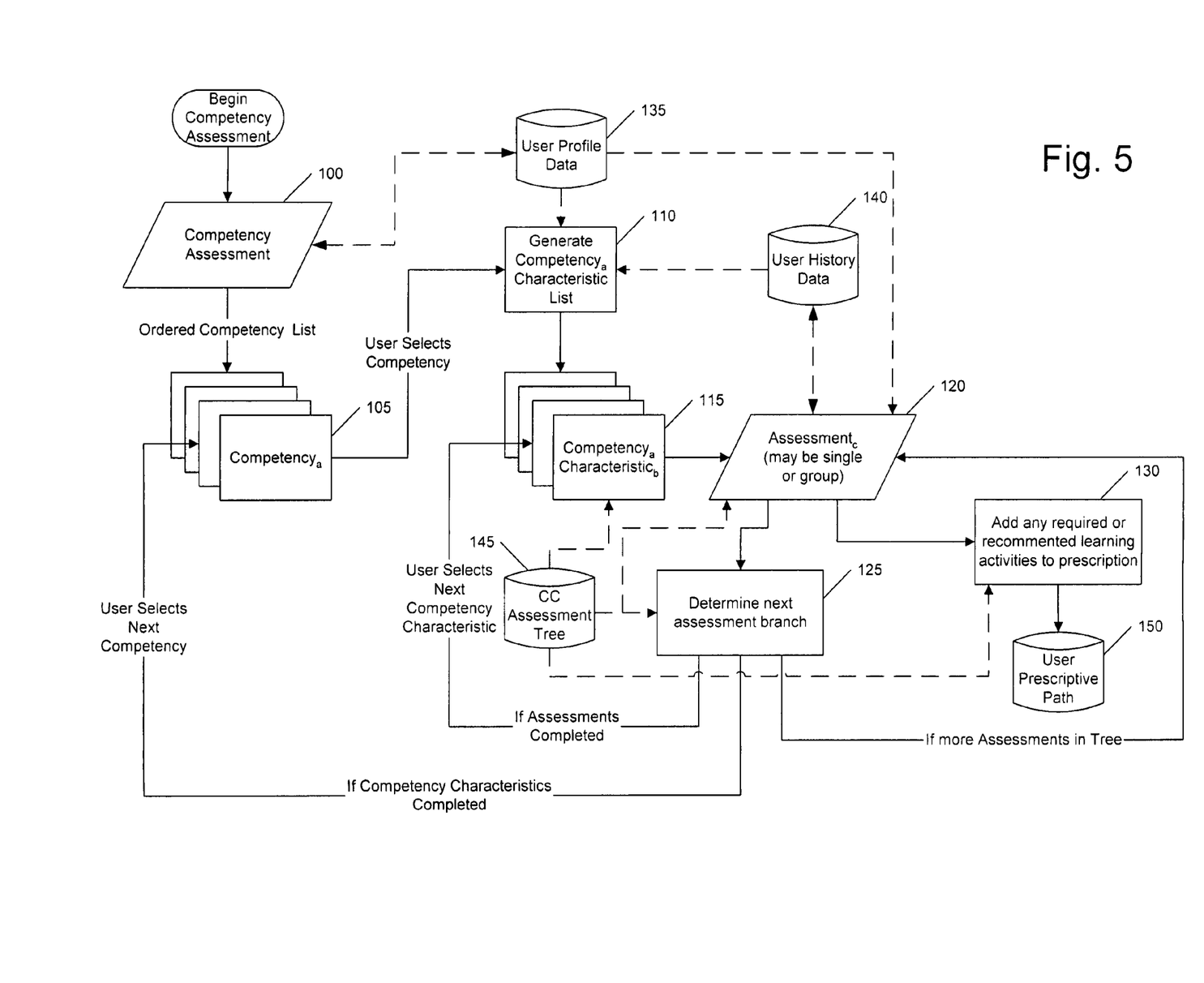
FIG. 5 is a flow chart illustrating operations according to some embodiments of the present invention.

FIG. 5 is a flowchart of operations according to some embodiments of the present invention for identifying a user specific path through the generic hierarchy. The operations of FIG. 5 may, for example, be carried out by the prescriptive learning application 62. As seen in the embodiments of FIG. 5, the identification of the path through the hierarchy may begin by an optional initial competency assessment (block 100) that may query the user to answer initial questions and, in combination with user profile data 135, may generate a user specific ordered list of competencies of relevance to the user. The user selects a competency from the ordered list (block 105) and a list of competency characteristics is generated (block 110) based on the selected competency (Competency$_a$), user profile data 135 and/or user history data 140. The list of competency characteristics generated may be fewer than all competency characteristics associated with a competency as a result of the user specific information. For example, if a competency has ten characteristics associate with it, but only five of those characteristics are relevant for a specific job category, the competency characteristics that do not relate to the job category of the user may be pruned from the list.

The user selects a competency characteristic (Competency$_a$ Characteristic$_b$) from the generated list of competency characteristics (block 115) and assessments associated with the selected competency characteristic are selected and are presented to the user (block 120). The assessments may be one or more assessments and may be selected, for example, based on the hierarchy of the competency characteristic (CC) assessment tree 145, user history data 140 and/or user profile data 135. Based on the responses to the assessments, rules (which may be specified in the CC assessment tree 145) may be used to identify learning activities to incorporate into the user prescriptive path 150. The scores and/or responses to the assessments may also be added to the user history data 140 for subsequent use.

Furthermore, a determination is made if there is a next branch of assessments in the CC assessment tree 145 (block 125). If there are more assessments (block 125), these assessments are selected and presented to the user as operations continue from block 120. If there are no more assessments (block 125), the user is prompted to select a next competency characteristic and operations continue from block 115. If there are no more competency characteristics (block 125), the user is prompted to select an additional competency and operations continue from block 105.

The user may view the user prescriptive path 150 to determine the learning activities that are prescribed for the user and may update the user information 135, 140 and/or 150 as to the completion of the learning activities.

Some embodiments of the present invention may be provided as a web application designed to help a student spend their limited learning time more effectively by presenting a one-stop access point for competency based education. Competency based education provides targeted learning focused on the individual strengths and areas needing improvement, to deliver core skills. The application may include a set of authoring and publishing tools for capture and presentation of the competency based education, which may include learning data delivered on the web. The tools may allow a user, such as an Instructional Designer (ID) with no web development skills, to generate sophisticated web pages using a series of web-based forms.

While some embodiments of the present invention are described herein with reference to "competencies," that term is used in a generic sense to refer to categories of skills that a users may be taught.

The authoring system, according to some embodiments of the present invention, may include a set of tools that provide the flexibility to support multiple styles of assessment to determine behaviors, characteristics, and/or knowledge, alter the flow of assessments based on user specific information, such as job category, band level, and assessment outcomes, and create unique rules for evaluating those outcomes for each intended audience. Thus, some embodiments of the present invention provide a web-based authoring system focused on user centered design principles to ensure an easy to use tool for instructional designers, yet one that supports the complexity of providing a meaningful instructional design methodology.

Particular embodiments of the present invention will now be described with reference to the screen captures of FIGS. 6 through 13, which reflect user interfaces of the web-based forms for generating a hierarchy and navigating the hierarchy by a user.

The flexibility to Support different types of competency-based education, knowledge chunking, and learning paths resulting in prescriptive learning personalized down to the individual student level may be provided by the logical combination of the three components of the authoring tools; assessment management; flow control using the tree structure; and rule management to assign scoring outcomes.

The assessment management component of the authoring tool may provide the ability to establish a scoring methodology that offers specific learning outcomes, as well as meaningful reuse in multiple learning paths. As discussed above, an assessment object is a collection of one or more questions and their associated answers. Total scores may be provided for the entire assessment by uniquely defining the point system for each individual answer. This approach may allow prescribing learning based on, not only the total score for the assessment, but the degree of correctness for an individual answer to a question. For example, if the answer selected by the student is completely incorrect, remedial activities can be added to the prescriptive learning.

The answer values, sequence of weighted assessments, and the resulting learning activities can be assigned at the assessment creation time. FIG. 6 is an example, of a web-based form that may be used to define these properties of an assessment. As seen in FIG. 6, different scores 200 may be associated with different answers 202. Also, different activities, including other assessment objects or learning activities, may be associated with the different answers 202 by selection from a required drop down menu 204 or an optional drop down menu 206.

Conventional competency based educational assessment typically only supports a single format of multiple choice assessment, which may not be effective in determining both behavior and characteristics skills. According to some embodiments of the present invention, multiple types of assessments may be used to effectively assess the skill levels attained in competency based education. The assessment management component may provide the ability to select the type of assessment based on the instructional requirements of the content.

The properties of an assessment object may include the type or format of the assessment. This may allow picking the appropriate assessment type at design time. For example, multiple choice, job-relevant, scenario-based assessments can be created to put the student in a simulated work-based situation allowing the ability to gauge how the student will react in a similar situation. An example of such a scenario based assessment is illustrated in FIG. 7.

Figure 8:
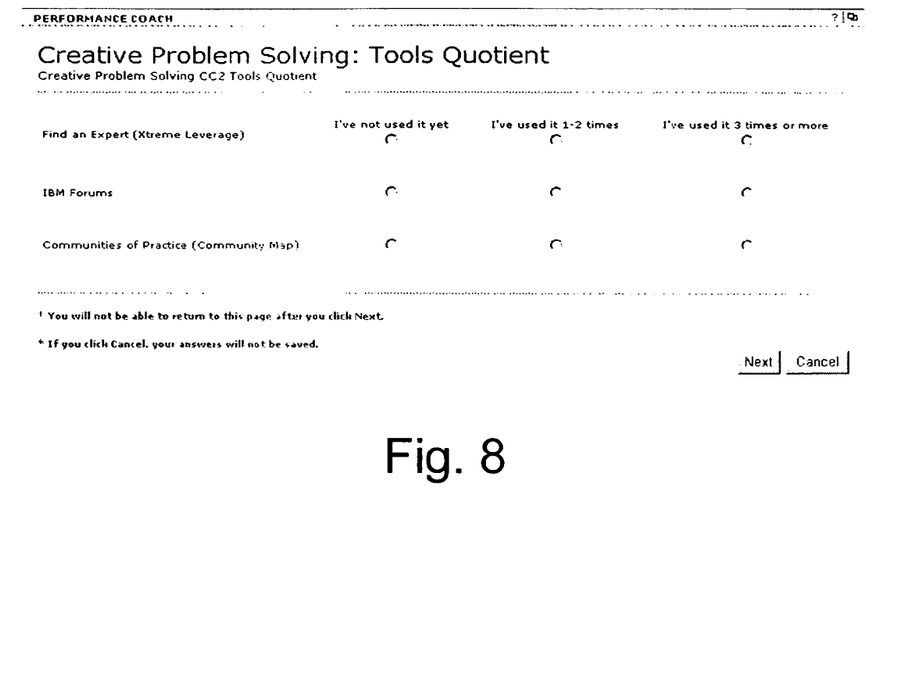
FIG. 8 is a screen capture of an exemplary Likert scale assessment according to some embodiments of the present invention.

The multiple choice assessment can immediately be followed by a Likert style assessment to help identify individual behaviors within a competency. An example of a Likert style assessment is illustrated in FIG. 8. An assessment combination may determine not only the characteristics, but may also determine the behaviors. This combination of assessments, along with simple multiple choice style questions that are currently supported by existing systems to determine specific knowledge, may allow for more precise skill assessment and consequently identify gaps resulting in prescriptive learning recommendations.

The tree structure component of the authoring tool may allow for identifying student profile properties, assigning the correct assessments, and assessing outcomes. The tree structure may be created by adding the learning objects (e.g., competency objects, competency characteristic objects, assessment objects, etc.) to the tree in a parent/child relationship aligned with branches (rules), which determine the path the learner will follow. These branches may be at key decision points and use student profile characteristics, assessment outcomes, and/or student answer/selection to dynamically determine the user specific path. The ability to change the flow and outcome for each student profile may also be provided. For example the same assessment can be delivered to a technical group and consulting group, but the same total score can generate different prescriptive learning. Similarly, different skill level students may be presented different assessments and/or the assessments may be scored differently.

Figure 9:
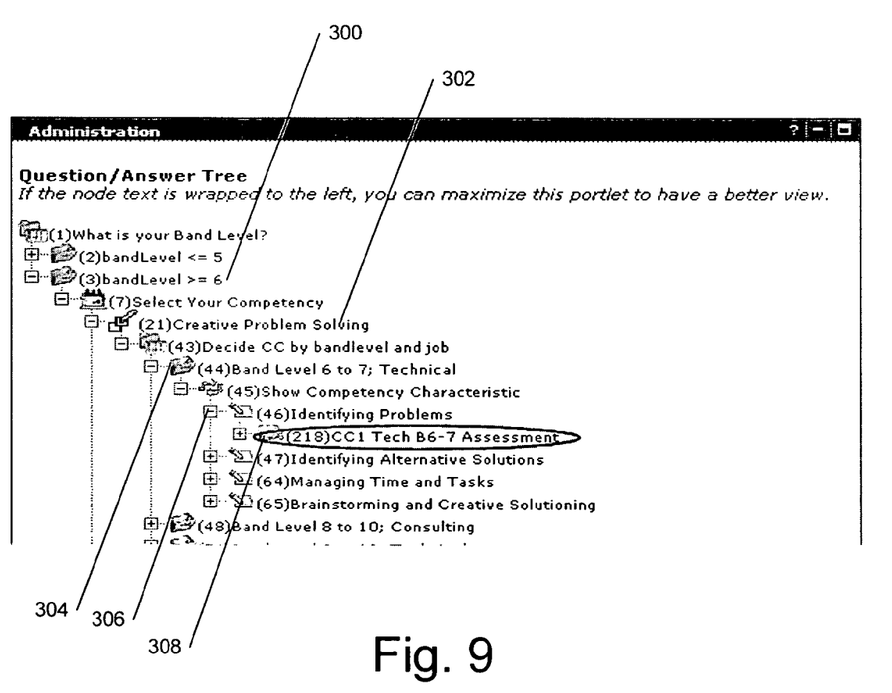
FIG. 9 is a screen capture of an exemplary tree structure incorporating job classifications and assessments according to some embodiments of the present invention.

As an example, a band level (competency level) 6 technical student may be presented the scenario based assessment as shown in FIG. 9. As seen in FIG. 9, an initial branching condition 300 evaluates to Band Level 6 for the user. The initial branching condition may be evaluated based on the user profile data as described above. The user selects the competency Creative Problem Solving 302 and, based on the band level and job category of the user 304, the list of competency characteristics is generated. The user selects the competency characteristic Identifying Problems 306 and an assessment 308 for the technical job category (Tech) and band level (B) 6-7 is provided to the user.

Figure 10:
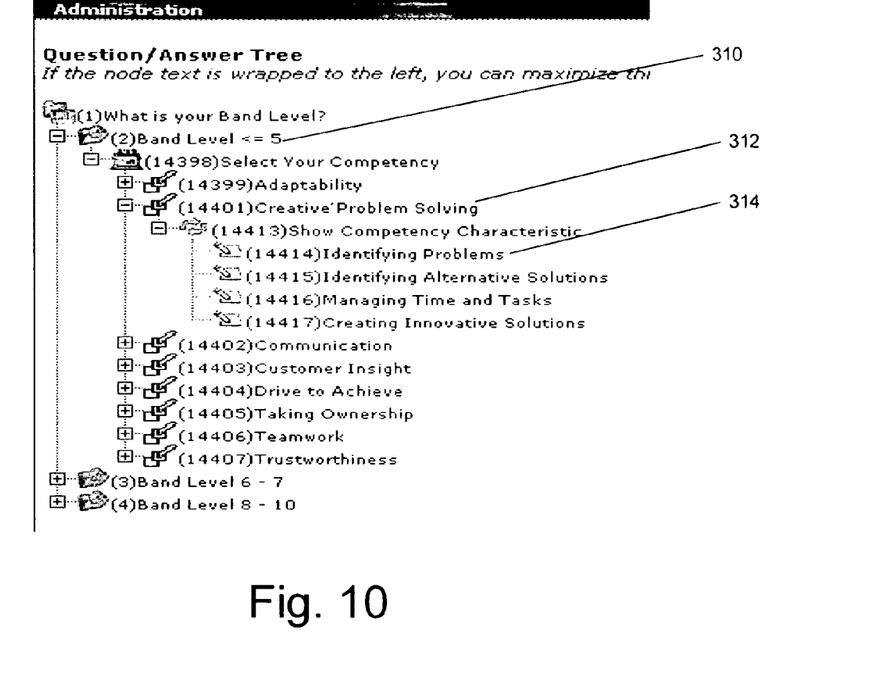
FIG. 10 is a screen capture of an exemplary tree structure without job classifications and assessments according to some embodiments of the present invention.

For the illustrated example, employees in bands less than five are not expected to possess these competency skills, therefore not necessitating a skill gap analysis. A flow may therefore be created using the tree component of the authoring tool that does not include assessments, and simply generates the full list of learning activities required for the competency. An example of such a tree hierarchy is illustrated in FIG. 10. As seen in FIG. 10, an initial branching question 310 evaluates to Band Level 5 or lower for the user. The initial branching question may be evaluated based on the user profile data as described above. The user selects the competency Creative Problem Solving 312 and the list of competency characteristics is generated. However, because the band level of the user is five or lower, it is assumed that all the learning activities are needed without the need for assessment. Thus, the competency characteristic Identifying Problems 314 does not have a child assessment (see FIG. 9, item 308) associated with the competency characteristic.

FIGS. 9 and 10 may also be used to illustrate how a tree view may be used to create the hierarchy of learning objects. An instructional designer, administrator or other authorized individual may select a branch in the tree and add objects below or above that branch by selecting objects from a list of available objects and inserting the objects into the tree at the selected location. Thus, instructional designer, administrator or other authorized individual may graphically author the hierarchy.

The rule objects provide a mechanism to support defining the prescriptive learning based on the individual student answers. The rule objects may be defined at design time and may be defined at assessment assignment points within the tree. The rule objects provide a non-programmatic method to implement specific outcomes based on the student answers. The factors influencing the outcomes may include the selected competency, profile characteristic(s), such as band level and job classification, the specific assessment(s) (format and order) for a selected competency characteristic or topic, plus the score(s) received from answers to the assessment(s).

Besides dynamically determining the user specific path (which defines the questions, or assessments that the user will take), the rules may also be used for additional purposes. In addition to the condition created in a rule, a set of learning activities can be assigned to that rule. Required activities and optional activities may be specified that will be dynamically added to the user specific prescribed learning path if the condition is met and the branch is followed. This allows for adding required or recommend learning activities to the user specific path based on any criteria from previous assessment scores, question answers, or profile information.

Figure 11:
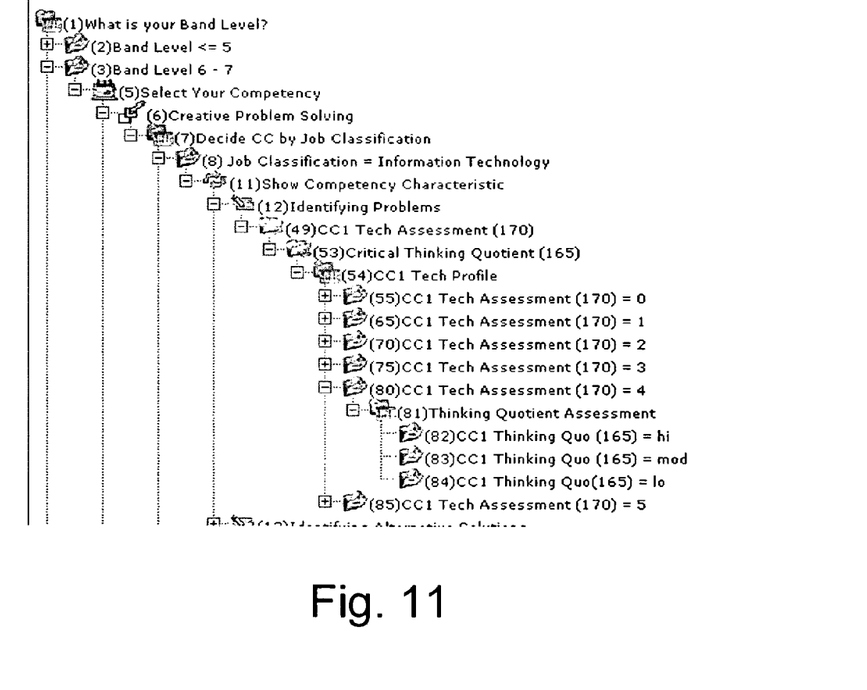
FIG. 11 is a screen capture of an exemplary tree structure incorporating rules according to some embodiments of the present invention.

Like all the other objects, the rule objects may be uniquely implemented along the paths within the tree. FIG. 11 shows the label for the rule created for the assessment given to technical employees at band level 6-7, for competency Creative Problem Solving and its subtopic Identifying Problems, and having a score equal to 4.

A rule object may be defined by picking an assessment from a list and then the activities may be then assigned. An example of the definition a rule object is illustrated in FIG. 12.

As seen in FIG. 12, a name 400 is provided for the rule object. The variable on which the rule is based may be selected from a drop-down menu 402 that provides a list of available variables. The comparison operator 404 and the value 406 are also defined. The required activities 408 and the optional activities 410 are also specified. If the variable evaluates to the value, then the required and optional activities are added to the user specific path. The final result presented to the user who selected Creative Problem Solving Competency, the Identifying Alternative Solutions characteristics, and received a score of 4 on the first assessment and who's profile defined them as band level 6-7. and identified their job category as Information Technology, are illustrated in FIG. 13. FIG. 13 contains the same list of activities as defined by the rule generator in FIG. 12.

The flowcharts and block diagrams of FIGS. 1 through 5 illustrate the architecture, functionality, and operation of possible implementations of systems, methods and computer program products according to various embodiments of the present invention. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A method of providing prescriptive learning for a user, said method comprising:

generating a user independent hierarchy, wherein the hierarchy comprises competencies, competency characteristics hierarchically associated with each competency, and assessments hierarchically associated with at least one competency characteristic of the competency characteristics, wherein each competency is a category of a skill, wherein each competency characteristic is a component of its associated competency, and wherein each assessment has an associated at least one rule that identifies learning activities;

after said generating the user independent hierarchy, performing an initial competency assessment by submitting queries to the user to prompt the user to answer initial questions;

after said performing the initial competency assessment, generating an ordered list of competencies, wherein the competencies of the hierarchy comprise the competencies on the ordered list of competencies, wherein said generating the ordered list of competencies is based on responses from the user to the submitted queries and from user profile data pertaining to the user, and wherein the user profile data comprises a job category of the user and a band level of the job category;

after said generating the ordered list of competencies, receiving an identification of a selected competency that has been selected by the user from the ordered list of competencies;

after said receiving the identification of the selected competency, generating a list of competency characteristics, wherein the competency characteristics hierarchically associated in the hierarchy with the selected competency comprise the competency characteristics on the list of competency characteristics, wherein said generating the list of competency characteristics is based on the selected competency, the job category of the user, and the band level of the job category, and wherein a total number of the competency characteristics on the list of competency characteristics is less than a total number of the competency characteristics hierarchically associated in the hierarchy with the selected competency;

after said generating the list of competency characteristics, receiving an identification of a selected competency characteristic that has been selected by the user from the list of competency characteristics;

after said receiving the identification of the selected competency characteristic, determining a first assessment and a second assessment, wherein the first assessment and the second assessment are each hierarchically associated in the hierarchy with the selected competency characteristic, and wherein said determining the first assessment and the second assessment is based on the job category of the user and the band level of the job category;

after said determining the first assessment and the second assessment, presenting the first assessment to the user;

after said presenting the first assessment to the user, receiving a first response from the user to the first assessment, said receiving the first response being performed before any learning activities for the user have been identified;

after said receiving the first response from the user, applying the at least one rule associated in the hierarchy with the first assessment to identify first learning activities for the user;

after said applying the at least one rule associated with the first assessment, presenting the second assessment to the user;

after said presenting the second assessment to the user, receiving a second response from the user to the second assessment;

after said receiving the second response from the user, applying the at least one rule associated in the hierarchy with the second assessment to identify second learning activities for the user;

after said applying the at least one rule associated with the second assessment, a processor of a data processing system generating a user prescriptive path through the hierarchy, wherein the user prescriptive path includes the first learning activities and the second learning activities; and after said generating the user prescriptive path, said processor presenting a view of the user prescriptive path to the user, which informs the user of the first learning activities and the second learning activities that have been identified for the user.

2. The method of claim 1, said method further comprising:
before said applying the at least one rule associated in the hierarchy with the first assessment to identify first learning activities, ascertaining that the band level of the job category is below a specified threshold band level.

3. The method of claim 1,
wherein the method further comprises said processor displaying a tree structure;
wherein the tree structure depicts a prompt for the user to identify the band level of the job category;
wherein the tree structure depicts a prompt for the user to select the competency;
wherein the tree structure identifies the selected competency, the selected competency characteristic, and the determined first assessment.

4. A computer program product, comprising a non-transitory computer readable storage medium having computer readable program code stored therein, said computer readable program code configured to be executed by a processor of data processing system to perform a method of providing prescriptive learning for a user, said method comprising:
generating a user independent hierarchy, wherein the hierarchy comprises competencies, competency characteristics hierarchically associated with each competency, and assessments hierarchically associated with at least one competency characteristic of the competency characteristics, wherein each competency is a category of a skill, wherein each competency characteristic is a component of its associated competency, and wherein each assessment has an associated at least one rule that identifies learning activities;
after said generating the user independent hierarchy, performing an initial competency assessment by submitting queries to the user to prompt the user to answer initial questions;
after said performing the initial competency assessment, generating an ordered list of competencies, wherein the competencies of the hierarchy comprise the competencies on the ordered list of competencies, wherein said generating the ordered list of competencies is based on responses from the user to the submitted queries and from user profile data pertaining to the user, and wherein the user profile data comprises a job category of the user and a band level of the job category;
after said generating the ordered list of competencies, receiving an identification of a selected competency that has been selected by the user from the ordered list of competencies;
after said receiving the identification of the selected competency, generating a list of competency characteristics, wherein the competency characteristics hierarchically associated in the hierarchy with the selected competency comprise the competency characteristics on the list of competency characteristics, wherein said generating the list of competency characteristics is based on the selected competency, the job category of the user, and the band level of the job category, and wherein a total number of the competency characteristics on the list of competency characteristics is less than a total number of the competency characteristics hierarchically associated in the hierarchy with the selected competency;
after said generating the list of competency characteristics, receiving an identification of a selected competency characteristic that has been selected by the user from the list of competency characteristics;
after said receiving the identification of the selected competency characteristic, determining a first assessment and a second assessment, wherein the first assessment and the second assessment are each hierarchically associated in the hierarchy with the selected competency characteristic, and wherein said determining the first assessment and the second assessment is based on the job category of the user and the band level of the job category;
after said determining the first assessment and the second assessment, presenting the first assessment to the user;
after said presenting the first assessment to the user, receiving a first response from the user to the first assessment, said receiving the first response being performed before any learning activities for the user have been identified;
after said receiving the first response from the user, applying the at least one rule associated in the hierarchy with the first assessment to identify first learning activities for the user;
after said applying the at least one rule associated with the first assessment, presenting the second assessment to the user;
after said presenting the second assessment to the user, receiving a second response from the user to the second assessment;
after said receiving the second response from the user, applying the at least one rule associated in the hierarchy with the second assessment to identify second learning activities for the user;
after said applying the at least one rule associated with the second assessment, generating a user prescriptive path through the hierarchy, wherein the user prescriptive path includes the first learning activities and the second learning activities; and
after said generating the user prescriptive path, presenting a view of the user prescriptive path to the user, which informs the user of the first learning activities and the second learning activities that have been identified for the user.

5. The computer program product of claim 4, said method further comprising:
before said applying the at least one rule associated in the hierarchy with the first assessment to identify first learning activities, ascertaining that the band level of the job category is below a specified threshold band level.

6. The computer program product of claim 4,
wherein the method further comprises said processor displaying a tree structure;
wherein the tree structure depicts a prompt for the user to identify the band level of the job category;
wherein the tree structure depicts a prompt for the user to select the competency;
wherein the tree structure identifies the selected competency, the selected competency characteristic, and the determined first assessment.

7. A data processing system comprising a processor and a computer readable memory unit coupled to the processor, said memory unit containing instructions configured to be executed by the processor to implement a method of providing prescriptive learning for a user, said method comprising:
generating a user independent hierarchy, wherein the hierarchy comprises competencies, competency characteristics hierarchically associated with each competency, and assessments hierarchically associated with at least one competency characteristic of the competency characteristics, wherein each competency is a category of a skill, wherein each competency characteristic is a component of its associated competency, and wherein each assessment has an associated at least one rule that identifies learning activities;

after said generating the user independent hierarchy, performing an initial competency assessment by submitting queries to the user to prompt the user to answer initial questions;

after said performing the initial competency assessment, generating an ordered list of competencies, wherein the competencies of the hierarchy comprise the competencies on the ordered list of competencies, wherein said generating the ordered list of competencies is based on responses from the user to the submitted queries and from user profile data pertaining to the user, and wherein the user profile data comprises a job category of the user and a band level of the job category;

after said generating the ordered list of competencies, receiving an identification of a selected competency that has been selected by the user from the ordered list of competencies;

after said receiving the identification of the selected competency, generating a list of competency characteristics, wherein the competency characteristics hierarchically associated in the hierarchy with the selected competency comprise the competency characteristics on the list of competency characteristics, wherein said generating the list of competency characteristics is based on the selected competency, the job category of the user, and the band level of the job category, and wherein a total number of the competency characteristics on the list of competency characteristics is less than a total number of the competency characteristics hierarchically associated in the hierarchy with the selected competency;

after said generating the list of competency characteristics, receiving an identification of a selected competency characteristic that has been selected by the user from the list of competency characteristics;

after said receiving the identification of the selected competency characteristic, determining a first assessment and a second assessment, wherein the first assessment and the second assessment are each hierarchically associated in the hierarchy with the selected competency characteristic, and wherein said determining the first assessment and the second assessment is based on the job category of the user and the band level of the job category;

after said determining the first assessment and the second assessment, presenting the first assessment to the user;

after said presenting the first assessment to the user, receiving a first response from the user to the first assessment, said receiving the first response being performed before any learning activities for the user have been identified;

after said receiving the first response from the user, applying the at least one rule associated in the hierarchy with the first assessment to identify first learning activities for the user;

after said applying the at least one rule associated with the first assessment, presenting the second assessment to the user;

after said presenting the second assessment to the user, receiving a second response from the user to the second assessment;

after said receiving the second response from the user, applying the at least one rule associated in the hierarchy with the second assessment to identify second learning activities for the user;

after said applying the at least one rule associated with the second assessment, generating a user prescriptive path through the hierarchy, wherein the user prescriptive path includes the first learning activities and the second learning activities; and after said generating the user prescriptive path, presenting a view of the user prescriptive path to the user, which informs the user of the first learning activities and the second learning activities that have been identified for the user.

8. The data processing system of claim 7, said method further comprising:
before said applying the at least one rule associated in the hierarchy with the first assessment to identify first learning activities, ascertaining that the band level of the job category is below a specified threshold band level.

9. The data processing system of claim 8,
wherein the method further comprises said processor displaying a tree structure;
wherein the tree structure depicts a prompt for the user to identify the band level of the job category;
wherein the tree structure depicts a prompt for the user to select the competency;
wherein the tree structure identifies the selected competency, the selected competency characteristic, and the determined first assessment.

* * * * *